April 17, 1962 C. R. SAUBER 3,030,579
ELECTRICAL APPARATUS
Filed July 11, 1958 4 Sheets-Sheet 1
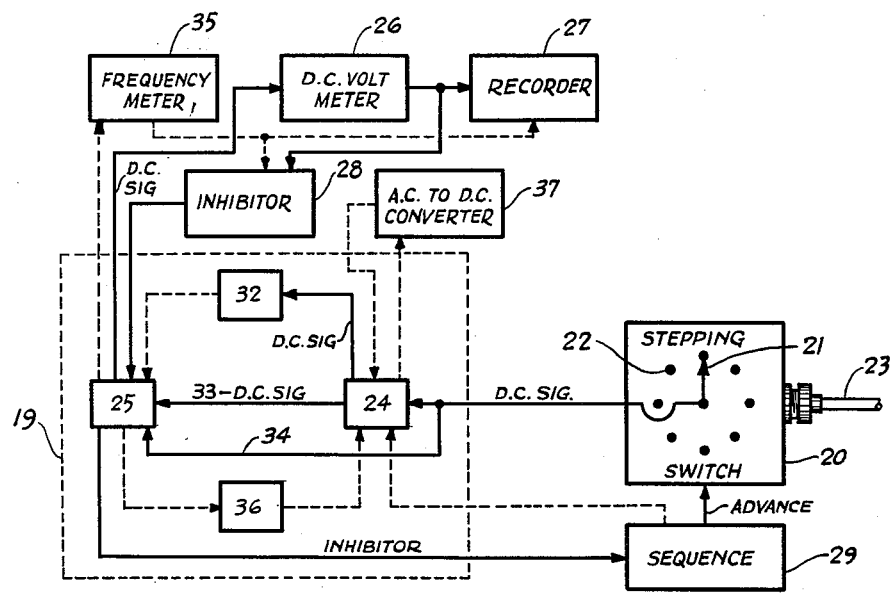
Fig_1
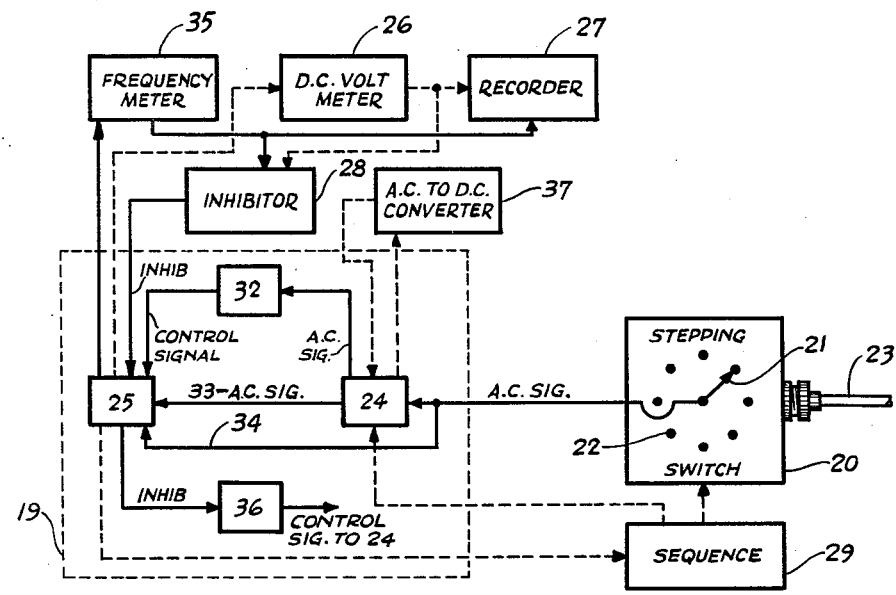
Fig_2
INVENTOR.
CHARLES R. SAUBER
BY
ATTORNEY.

April 17, 1962     C. R. SAUBER     3,030,579
ELECTRICAL APPARATUS
Filed July 11, 1958     4 Sheets-Sheet 2
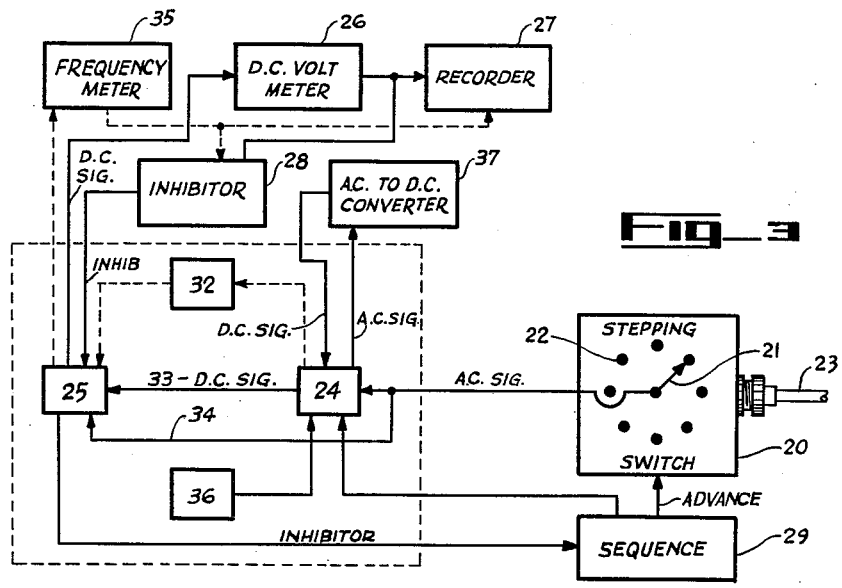
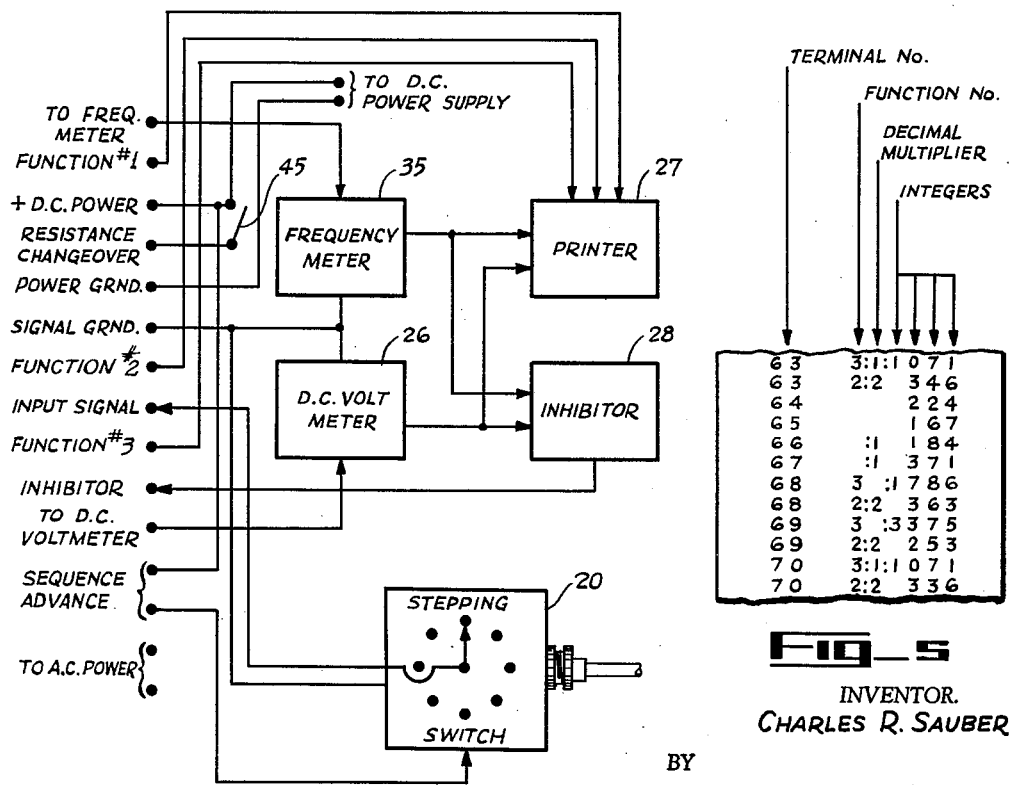
INVENTOR.
CHARLES R. SAUBER
BY
ATTORNEY

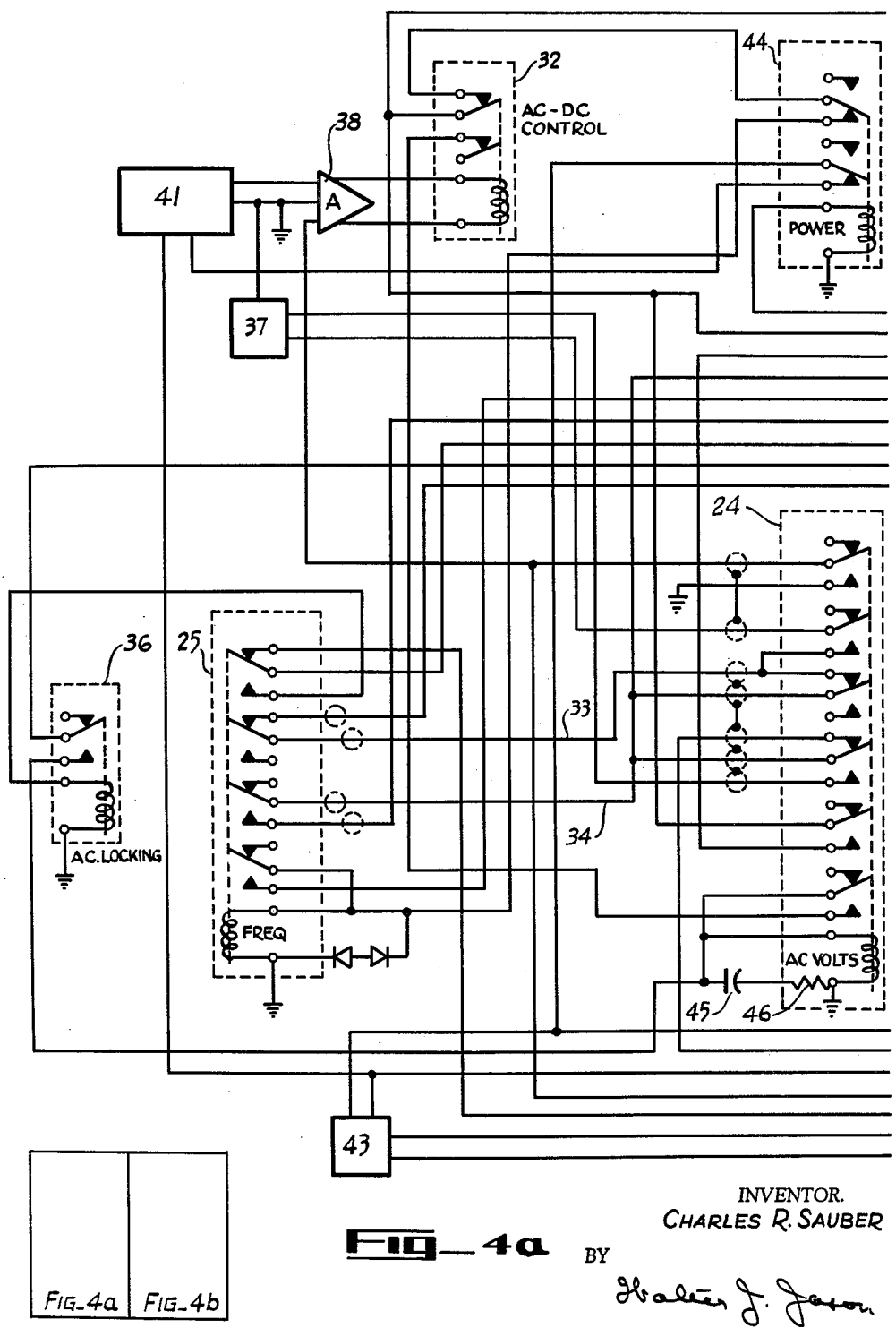

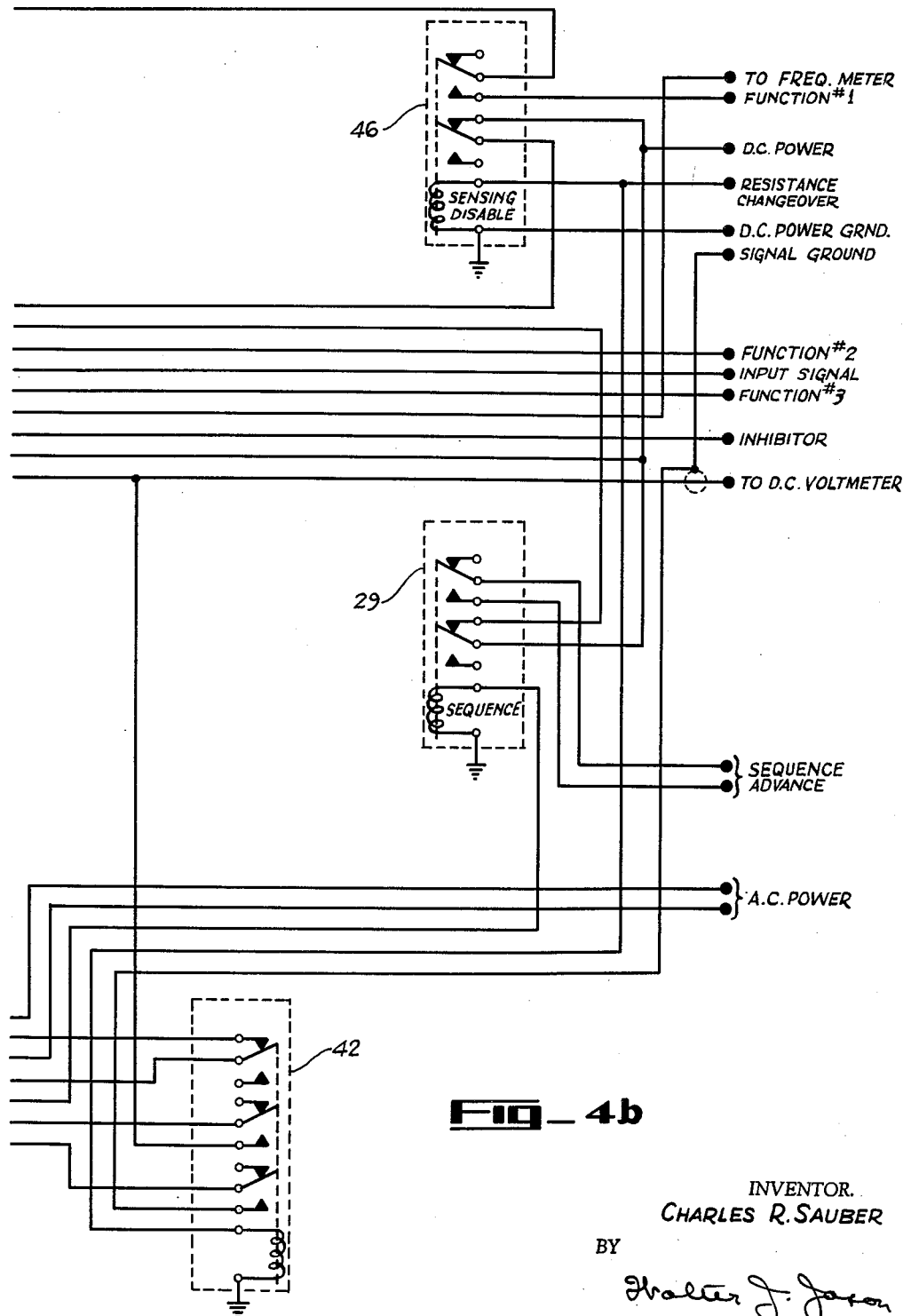

United States Patent Office 3,030,579
Patented Apr. 17, 1962

3,030,579
ELECTRICAL APPARATUS
Charles R. Sauber, San Diego, Calif., assignor to General Dynamics Corporation, San Diego, Calif., a corporation of Delaware
Filed July 11, 1958, Ser. No. 747,864
18 Claims. (Cl. 324—73)

The present invention relates to electrical apparatus used for automatic checkout or testing of electrical equipment, and more particularly relates to electrical apparatus which rapidly sense and record electrical signals appearing on a large number of terminals.

Two general types of prior automatic testing and checkout equipment are punched card programmed systems and punched tape programmed systems. These systems are controlled by information fed them on punched card or tape. The punching of the cards or tapes is called programming and it is an operation which requires considerable time. An object of the present invention is to provide an automatic test or checkout system which does not require programming.

When changes are made in the electrical equipment being tested then the program of a prior type of test system must be altered to compensate for this change. At times, the entire programming operation may have to be redone. Another object of the present invention is to provide an automatic test or checkout system which does not have to be changed when the equipment being tested is changed or altered.

Punched card and tape systems are generally unsuited for use in aircraft because they are bulky and heavy. In contrast, an object of the present invention is to provide a relatively compact and lightweight unit.

Prior automatic testing and checkout systems have been limited in their actual use by their high initial cost and subsequent programming time cost. Another object of the present invention is to provide an automatic checkout or test system which has a relatively inexpensive initial cost. It should be apparent that with the elimination of programming the operational costs of the present invention are also considerably lower than those of prior systems.

The present invention is generally comprised of a switch matrix and a plurality of electrical devices which respond to varied electrical signal characteristics. While one device may respond to D.C. voltages another may respond to A.C. frequencies, and still a third may be sensitive to A.C. voltage magnitudes. The switch matrix receives an input signal from the equipment being tested and sends or routes it to the proper device in accordance with its characteristics.

Because of this ability to "sense" the characteristics of input signals and route them accordingly, the present invention has many possible applications. It can be used in data logging to measure and record a large number and variety of electrical signals, or it can be used as a test system to measure, record, read-out, and respond to, electrical input signals. The invention can also be used for measuring the output resistance of electrical circuits being tested, and for checking electrical cables and complex relay circuits.

Other applications, objects, and features of the present invention will be readily apparent to those skilled in the art from the following specification and appended drawings wherein is illustrated a preferred form of the invention, and in which:

FIGURE 1 is a block diagram generally outlining the invention and indicating one mode of its operation. The solid flow lines in this figure represent the flow of signals in response to a D.C. input signal. The dotted lines represent alternate signal flow paths or leads used in response to the "frequency" and "voltage" of an A.C. input signal.

FIGURE 2 is a block diagram generally indicating another mode of operation of the invention. Here the solid lines represent signal flow in response to the "frequency" of an A.C. input signal. Some of the dotted lines represent alternate paths used in response to A.C. "voltage" and others represent the paths followed in response to a D.C. input signal.

FIGURE 3 is a block diagram generally indicating still another mode of operation of the invention. In this figure the solid lines represent signal flow in response to the "voltage" of an A.C. input signal. The dotted lines represent alternate paths used in response to A.C. "frequency" and D.C. voltage.

FIGURES 4a and 4b comprise a schematic which shows the detail of the switching matrix portion of the present invention.

FIGURE 5 illustrates a portion of a tape on which various electrical input signals have been recorded.

FIGURE 6 is a diagram illustrating the functioning of the measuring and recording portion of the present invention.

Referring now to FIGURE 1, the switching matrix portion of the present invention is generally contained within dashed outline 19. A conventional stepping switch 20 receives signals from the equipment being tested and sends them to the switching matrix. Switch 20 has a brush 21 which makes successive electrical contacts with terminals or pins 22. Each terminal is connected to a conductive lead which passes through the input cable 23 to the equipment being tested. In FIGURE 1 it is presumed that the brush is in contact with a terminal on which there is a D.C. voltage. This D.C. input signal is transmitted to switching units 24 and 25, as shown by the solid signal flow lines or leads. Switching unit 24 sends the input signal to switching units 32 and 25. This is the normal state for switching unit 24. Thus, the input signal is received by switching unit 25 on two different leads, 34 and 33. The switching unit 32 responds only to A.C. input signals so it ignores the D.C. input signal communicated to it in this instance. The switching unit 25 connects lead 33 to the D.C. voltmeter lead and ignores lead 34. This is the normal state for switching unit 25. The voltmeter then measures the D.C. input signal and sends corresponding information to a recorder 27 and inhibitor 28. The recorder makes a record of the information and the inhibitor produces a voltage pulse that is sent back through switching unit 25 to a sequence switching unit 29. This momentarily activates the sequence switching unit, causing a voltage pulse to be transmitted to the stepping switch. The voltage pulse causes the brush in the stepping switch to advance to the next terminal. If the next terminal contacted carries a D.C. input signal then the above events will be repeated. However, if an A.C. input signal is on the newly contacted terminal then a different series of events will follow.

In FIGURE 2 it is presumed that the brush has made contact with a terminal on which there is an A.C. input signal. This signal is communicated to switching units 24 and 25. The signal received by switching unit 24 is sent through to switching unit 32 and also to switching unit 25 via lead 33. In FIGURE 1 the lead 33 was connected, by switching unit 25, to a line leading to the D.C. voltmeter. This connection has not been changed as yet. Also, in FIGURE 1, the D.C. input signal could not affect switching unit 32 because it was sensitive to A.C. signals only. Now, however, the input signal is an A.C. signal and the switching unit 32 responds by sending a control signal to switching unit 25 that causes the lead 33 to be disconnected from the D.C. voltmeter lead, and the lead 34 to be connected to the lead of the frequency meter 35. The frequency meter measures the frequency of the A.C. input signal and sends the corresponding information to the recorder and the inhibitor. The recorder records the frequency and the inhibitor sends a voltage pulse back to switching unit 25. The control signal from switching unit 32 causes switching unit 25 to route the inhibitor pulse to switching unit 36 instead of the sequence switch as was done when the input signal was a D.C. signal. Switching unit 36 responds by transmitting a control signal, of short duration, to switching unit 24. This starts a chain of events which lead to the measurement of the "voltage" of the A.C. input signal.

FIGURE 3 shows how this measurement is made. The control signal is communicated from switching unit 36 to switching unit 24. In response, switching unit 24 routes the A.C. input signal to the A.C. to D.C. converter 37 instead of to the switching unit 32. The converter transforms the A.C. input signal into an equivalent D.C. signal which is sent back through switching unit 24 to switching unit 25. When switching unit 24 routes the A.C. input signal away from switching unit 32 and sends it to the converter, then switching unit 32 no longer sends a control signal to switching unit 25. As a result of the discontinuance of this control signal the switching unit 25 returns to its normal state, i.e., lead 33 is connected to the D.C. voltmeter lead and lead 34 is ignored. As shown in FIGURE 3, lead 33 now carries the D.C. voltage which corresponds to the A.C. input voltage. The voltmeter measures this equivalent D.C. voltage and sends the information to the recorder and the inhibitor. The inhibitor produces a voltage pulse that is transmitted to switching unit 25 and, since 25 is now in its normal state, the pulse is sent to the sequence switching unit. The sequence switching unit then tells the stepping switch to advance to the next terminal. At the same time, the sequence switching unit tells switching unit 24 to return to its normal state. The system is then ready to receive another input signal. If it is a D.C. signal it will be routed as shown in FIGURE 1. If it is an A.C. signal it will be routed as shown in FIGURES 2 and 3. In FIGURE 3 the A.C. "voltage" is converted to D.C. and then measured by a D.C. voltmeter. This eliminates the need for an A.C. voltmeter, reducing overall weight and size of the invention. This does not, however, preclude the use of an A.C. voltmeter if one is desired.

FIGURES 1 through 3 are used to illustrate a system which "measures" and "records" various electrical inputs. As previously mentioned, however, the invention has many possible applications other than the mere "measuring" and "recording" of input signals. Other devices can be used either in conjunction with the measuring instruments or in their place. These devices may be transducers which transform the electrical input signals into mechanical movement, or electrical circuits, transformers, amplifiers and the like which change the characteristics of the input signals so that they can be utilized by other attendant apparatus.

In contrast to this system, punched card programmed and punched tape programmed systems do not route input signals to their proper destination in accordance with the characteristics of the input signals; rather, they send input signals to their destination in accordance with the input terminal number. For example, an input signal appearing on a particular input terminal may be sent to a frequency meter regardless of the fact that the signal on that particular terminal may be a D.C. voltage.

While FIGURES 1 through 3 disclose the novel concept which is used in this invention they do not show a detailed embodiment, and many operations of the various switching units were neglected to facilitate the explanation. FIGURES 4a and 4b, however, fully disclose the switching matrix portion of the present invention with attendant electrical circuitry.

In FIGURES 4a and 4b the switching units are depicted as conventional relays. However, since transistor and tube switching circuits can perform many of the switching functions of relays there may be instances where equivalents are obvious to those skilled in the art.

The stepping switch 20 illustrated in FIGURES 1 through 3 is not shown in FIGURE 4a or 4b. This stepping switch was shown with a number of "signal" terminals 22 but no corresponding ground terminals or leads. The number of ground leads and terminals used depends on the equipment being tested. Quite often only one signal ground lead is needed, but should there be a number of ground leads to be accommodated than dual brush stepping switches or other conventional means can be used. The preferred embodiment in FIGURE 4b shows only one terminal labeled "signal ground." This terminal may be connected directly to the ground lead of the equipment being tested or it may be attached to a ground lead which runs through the stepping switch and input cable to the equipment being tested.

Assume now, as in FIGURE 1, that the input signal is a D.C. voltage. This means that a D.C. voltage appears between the terminals labeled "input signal" and "signal ground." This input signal is communicated to an amplifier 38 through the contacts of switching units 24 and 42, both switches being in their normal or open position. The amplifier is an A.C. amplifier which holds switching unit 32 in a closed position until it receives an A.C. signal. A D.C. input signal has no effect on the amplifier and, thus, no effect on switching unit 32. The amplifier uses transistors and power is supplied it by a power converter 41. The power converter 41 transforms conventional A.C. line voltage into the D.C. voltage required by the amplifier.

The D.C. input signal is transmitted to switching unit 25 via lead 34 and also via lead 33 through switching unit 24. Switching unit 25 is in its open, or normal state, so the input signal is sent on from lead 33 to the terminal labeled "to D.C. voltmeter" while lead 34 is ignored. The voltmeter, recorder, and inhibitor are not shown in FIGURE 4a or 4b but their operation corresponds to that which is generaly indicated in FIGURE 1. That is, the voltage is measured, recorded, and an inhibitor signal produced. The inhibitor signal returns to the switching matrix on the terminal labeled "inhibitor," shown in FIGURE 4b. The inhibitor signal "pulse" is then sent through open switching unit 25 to the sequence switching unit 29. The relay contacts of switching unit 29 close momentarily and a control signal is sent to the stepping switch causing it to advance.

Assume now, as in FIGURE 2, that the input signal is an A.C. signal. It is sent through open switching units 24 and 42 to the A.C. amplifier 38. The amplifier normally keeps the switching unit 32 closed, but in response to an A.C. input signal the amplifier opens the switching unit 32 and the position of the contacts is then as shown in FIGURE 4a. The lead attached to the movable contact, or armature, of switching unit 32 can be traced through open sequence switch 29 to the terminal labeled "D.C. Power." Thus, in response to an A.C. input signal, a D.C. power supply voltage is sent through switching unit 32. This voltage is transmitted from 32 to a closed switching unit 44, whose function will be explained later, and thence to the control coil of switching unit 25, causing switching unit 25 to close. This connects lead 34, which carries the A.C. input signal, to a lead attached to the terminal labeled "To Freq. Meter." It also connects the "Function #3" terminal lead to the power supply voltage which has just been sent to switching unit 25 to cause it to close. The "Function #3" terminal is connected to the recorder, so the power supply voltage is transmitted thereto. The recorder responds by indicating that a frequency is being measured and recorded.

At the same time, since lead 34 has been connected to the frequency meter, the frequency is measured and the corresponding information is sent to the recorder. Thus, the recorder records the value of the parameter and also indicates what it is; in this instance, a frequency.

The inhibitor receives a signal from the frequency meter and it responds by producing a voltage pulse which is sent to the "inhibitor" terminal. From there it is communicated to switching unit 25, which is closed, and then to the control coil of switching unit 36. Switching unit 36 responds to the inhibitor voltage pulse by closing momentarily. Switching unit 36 is a slow release switching unit that does not open when the inhibitor pulse terminates. Instead, it delays opening for a short period of time. The reason for this delay will be explained shortly, and the preferred means for accomplishing it is a conventional "shaded pole" type of relay.

The movable contact of switching unit 36 carries the D.C. power supply voltage and, when the contact closes in response to the inhibitor pulse, the power supply voltage is transmitted to the control coil of switching unit 24 causing this switching unit to close. The control coil of 24 is in parallel with a time delay circuit which, in the preferred embodiment, is merely the capacitor 45 and resistor 46 shown in FIGURE 4. This circuit will delay the opening of switch 24 when the shaded pole relay 32 finally opens and removes the power supply voltage from the control coil of 24.

With switching unit 24 closed in response to the power supply voltage received from 36, the system is ready to measure and record the "voltage" of the A.C. input signal, as in FIGURE 3. With 24 closed, the A.C. input signal is no longer sent through switch 42 to amplifier 38 so switch 32 returns to its closed position. In this position the power supply voltage on the movable contact of 32 is sent to one of the terminals of unit 24 and then on to the control coil of unit 24. The unit 24 has been held closed by the combination of the slow release of switching unit 36 and the time delay circuit in parallel with the control coil of 24. They hold switching unit 24 closed just long enough for unit 32 to close and send the power supply voltage to unit 24 via another route so that it can take over the task of holding unit 24 closed.

With unit 24 closed the A.C. input signal can be converted to an equivalent D.C. voltage and then measured and recorded. With 24 closed the A.C. input signal is routed to the A.C. to D.C. converter 37. Converter 37 changes the A.C. input voltage into an equivalent D.C. voltage. This D.C. voltage returns through closed switching unit 24 to switching unit 25. Switching unit 25 is now open, unit 32 having removed the power supply voltage, so the equivalent D.C. signal is routed to the terminal labeled "to voltmeter." The signal is then measured by the voltmeter and its value recorded by the recorder. When switching unit 24 closes in response to the power supply voltage received from unit 36 it connects the power supply voltage to the "Function #2" terminal lead. The power supply voltage is then sent to the recorder which indicates that an A.C. "voltage" is being recorded. The voltmeter sends a signal to the inhibitor and an inhibitor pulse is generated and sent back to the inhibitor terminal. From there it is transmitted through the open switching unit 25 to the sequence switching unit 29. The sequence switching unit responds to the short duration inhibitor voltage pulse by closing momentarily. This closes the sequence advance circuit, causing the stepping switch to advance to the next pair of terminals. When the sequence switching unit momentarily closes it also temporarily removes the power supply voltage from the movable contact of closed switching unit 32, removing the power supply voltage from switching unit 24 and causing it to open. When the power supply voltage is reapplied to switching unit 24 it is applied to a contact which has been isolated by the opening operation of switching unit 24. As a result, switching unit 24 remains open and is ready to receive the next input signal sent to it from the stepping switch.

Whether the next input voltage is A.C. or D.C. its voltage "magnitude" will be measured and recorded. If the signal is A.C. then its "frequency" will be measured and recorded also. Since the system is primarily intended as a test or checkout system the recorded information should be in a form which can be easily and rapidly read by a human operator. The preferred type of recorder is one which prints the information it receives on a tape. These types of printers are conventional and commercially available from firms such as Clary, Hewlett Packard, and Computer Measurements.

FIGURE 5 shows a portion of a tape on which information has been recorded by a printer used in the present invention. The integers in the last four columns are the numbers corresponding to the value of the input signal. The number in the fifth column from the right is the decimal multiplier which places the decimal point. The number in the sixth column from the right is the function number which indicates whether the integers refer to a frequency, D.C. voltage, resistance, or the like. The first two numbers from the left indicate the input terminal or pin number. For example, on pin 63 there is an A.C. "frequency" (Function #3) whose value is $1071 \times 10^{-1}$ or 107.1 c.p.s. (the decimal point is placed by the :1:). The value of the A.C. "voltage" on pin 63 is 3.46 volts (average volts, due to A.C. to D.C. converter used). On terminal 67 there is no function number. This indicates a D.C. voltage whose value is 37.1 volts. Negative voltages are printed in red and positive voltages are printed in black. The assignment of function numbers is completely arbitrary and they are determined by the manner in which the function terminals, shown in FIGURE 4b, are connected to the printer.

FIGURE 6 shows these and other terminals of FIGURE 4b connected to the measuring and recording apparatus. One of the terminals shown in FIGURE 6 is labeled "Function #1." This function number is not found on the tape in FIGURE 5 because it is used to indicate a resistance value in ohms. In order to measure the output resistances of circuits being tested the electrical power in those circuits must be off. This means that output signals and output resistances cannot be measured at the same time.

Assuming that the electrical power to the circuits being tested is turned off, the invention can be used to measure output resistances by closing the switch 45 which is shown in FIGURE 6. This communicates the D.C. power supply voltage to the terminal labeled "Resistance Changeover." Referring to FIGURES 4a and 4b, it can be seen that this voltage is transmitted to switching unit 46 and causes it to close. This connects the power supply voltage to the function #1 terminal and it also removes the power supply voltage from switching unit 44, causing it to open. When switching unit 44 opens, the A.C. power supply input to the A.C. to D.C. power converter 41 is interrupted. This, naturally, terminates the D.C. power supplied to amplifier 38 and causes switching unit 32 to open. With amplifier 38 inoperative, and switching units 32 and 44 both open, the switching units 24 and 25 can no longer operate in response to an A.C. input signal and they will remain in the open position. In a sense, the switching matrix portion of the invention is "disabled" when switch 45 is closed. The need for this will be explained later.

With switch 45 closed the power supply voltage, in addition to being sent to switching unit 46 to initiate the "disabling" process, is communicated to the control coil of switching unit 42. This causes switching unit 42 to close and place a constant current generator 43 in parallel with the D.C. voltmeter and the output resistance of the circuit being tested. The constant current generator 43 produces a constant D.C. current and the voltmeter measures the voltage drop across the output resistance of the circuit being tested. The current generator is calibrated initially so that the volts measured by the voltmeter are equal to the resistance in ohms. The voltmeter sends the information on to the printer which records it. As usual, the inhibitor also receives a signal from the voltmeter and sends a voltage pulse back through switching unit 25 to the sequence switching unit 29. Switching unit 29 closes momentarily and causes the stepping switch to advance to the next terminal so that the output resistance of the next circuit may be measured and recorded.

The "disabling" procedure that occurs immediately prior to measuring resistance is a precautionary step, and the need for its use depends on the environment in which the invention is used. The A.C. amplifier 38 must be sensitive to low A.C. input signals as well as high A.C. input signals. As a result it may "pick-up" and respond to signals from surrounding electrical equipment when the system is trying to measure and record resistance. To insure that this will not happen, no matter what the environmental conditions, the amplifier is disabled by turning off its power supply. In addition, when switching unit 42 closes, the amplifier is disconnected from the input signal lead. Thus, any transient current resulting from the sudden connection of the current generator in parallel with the voltmeter and output resistance will not reach the amplifier.

After the system has undergone this "resistance changeover" it can be returned to its normal mode of operation, that of measuring and recording electrical input signals, by merely opening the resistance changeover switch 45.

Whether the system is measuring resistance or electrical signals the operation of the recording portion of the system remains the same. The voltmeter measures the D.C. signal it receives and sends corresponding information to the recorder and inhibitor. The inhibitor, in turn, produces a voltage pulse which is sent to switching unit 25. The inhibitor is shown as a separate unit in FIGURE 6. This is not a requirement, however, for all that is needed is some means for producing a voltage pulse. Almost any printer that is used could provide the needed pulse and some voltmeters and frequency meters could supply the voltage pulse. The separate inhibitor 28 shown in FIGURE 6 can be a conventional relay circuit which responds everytime the frequency meter or voltmeter sends information to the printer. The power supply voltage can be connected to the relay and the momentary opening or closing of the relay can be used to provide the necessary voltage pulse.

The tape printer should be one which requires a binary input since almost all commercially available frequency meters have binary outputs. Binary output voltmeters are also commercially available. Some of these voltmeters can be used to provide a periodic output signal that causes the inhibitor to operate whether there is an input signal or not. Thus, when the stepping switch brush makes contact with a "dead" pin, the voltmeter waits a certain time and then sends a signal to the inhibitor, causing the stepping switch to advance. This feature is used in the preferred embodiment.

A wide variety of measuring and recording instruments that can perform the functions required by the preferred embodiment are commercially available. It is not necessary to use measuring instruments having binary outputs since binary to decimal converters and decimal input printers are available. The Berkeley division of Beckman Instruments, Inc. sell a complete system, Model 5710-24, that meets the measuring and recording requirements of the preferred embodiment disclosed herein.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. An automatic checkout system comprising a switch matrix having an input signal lead and a first switching unit connected to said input signal lead, a second switching unit connected to said input signal lead, and control means responsive only to signals of periodic waveform having positive and negative portions connected between said first and second switching units for controlling said second switching unit independently of said first switching unit in accordance with the waveform of the input signals received by said first switching unit.

2. An automatic checkout system comprising a switch matrix having an input signal lead and a first switching unit connected to said input signal lead, a second switching unit connected to said first switching unit for receiving signals from said input signal lead, and control means responsive only to signals of periodic waveform having positive and negative portions connected between said first and second switching units for controlling said second switching unit independently of said first switching unit in accordance with the waveform of the input signals received by said first switching unit.

3. An automatic checkout system comprising a switch matrix having an input signal lead and a first switching unit connected to said input signal lead, a second switching unit having two signal leads with one of said leads connected to said input signal lead and the other connected to said first switching unit, and control means responsive only to signals of periodic waveform having positive and negative portions connected between said first and second switching units for controlling said second switching unit independently of said first switching unit in accordance with the waveform of the input signals received by said first switching unit.

4. An automatic checkout system comprising a switch matrix having an input signal lead and a first switching unit connected to said input signal lead, a second switching unit having two signal leads with one of said signal leads connected to said input signal lead and the other connected to said first switching unit, control means responsive only to signals of periodic waveform having positive and negative portions connected between said first and second switching units for controlling said second switching unit independently of said first switching unit in accordance with the waveform of the input signals received by said first switching unit, and said first switching unit selectively communicating input signals received by it to said second switching unit and said control means.

5. An automatic checkout system comprising a switch matrix and a plurality of electrical devices, said switch matrix having an input signal lead and a first switching unit connected to said input signal lead, a second switching unit connected to said first switching unit for selectively receiving input signals from said input signal lead, at least one of said plurality of electrical devices connected to said second switching unit for selectively receiving said input signals, control means connected between said first and second switching units for controlling said second switching unit in accordance with input signals received by said first switching unit, and said first switching unit selectively communicating input signals received by it to said control means and said second switching unit.

6. An automatic checkout system comprising a switch matrix and a plurality of electrical devices, said switch matrix having an input signal lead, a first switching unit connected to said input signal lead and receiving input signals therefrom, a second switching unit having two signal leads with one of said signal leads connected to said input signal lead and the other connected to said first switching unit, control means connected between said first and second switching units for controlling said second switching unit in accordance with the characteristics of said input signals, said first switching unit selectively communicating said input signals to said control means and said second switching unit, and a plurality of electrical devices connected to said second switching unit and selectively receiving said input signals therefrom as directed by said control means.

7. An automatic checkout system comprising a switch matrix and a plurality of electrical devices, said switch matrix having an input signal lead, a first switching unit connected to said input signal lead and receiving input signals therefrom, a second switching unit having two signal leads with one of said signal leads connected to said input signal lead and the other connected to said first switching unit, control means connected between said first and second switching units for controlling said second switching unit in accordance with the characteristics of said input signals, said first switching unit selectively communicating said input signals to said control means and said second switching unit, a plurality of signal measuring devices connected to said second switching unit and selectively receiving said input signals therefrom as directed by said control means, and signal recording means connected to said plurality of signal measuring devices whereby said input signals are measured and recorded.

8. An automatic checkout system comprising a stepping switch having a plurality of input terminals and an output terminal, said stepping switch including means for sequentially communicating input signals appearing on said input terminals to said output terminal, a first switching unit connected to said output terminal, a second switching unit having an input lead connected to said output terminal and an input lead connected to said first switching unit, control means connected between said first and second switching units for controlling said second switching unit in accordance with the characteristics of said input signals, said first switching unit selectively communicating said input signals to said control means and said second switching unit, a plurality of signal measuring devices connected to said second switching unit and selectively receiving said input signals therefrom as directed by said control means, a recorder connected to said plurality of signal measuring devices, means connected to said plurality of signal measuring devices for producing a voltage pulse whenever a measurement is made, said means being connected to said second switching unit to transmit said voltage pulse thereto, and means connected between said second switching unit and said stepping switch for utilizing said voltage pulse to cause said stepping switch to advance.

9. An automatic checkout system comprising a stepping switch having a plurality of input terminals and an output terminal, a first switching unit connected to said output terminal, a second switching unit having an input lead connected to said output terminal and an input lead connected to said first switching unit, A.C. responsive control means connected between said first and second switching units for controlling said second switching unit in response to A.C. signals received from said first switching unit, an A.C. to D.C. converter having its input and output connected to said first switching unit, said first switching unit including means for selectively communicating input signals it receives from said stepping switch to said second switching unit and said A.C. responsive control means and said A.C. to D.C. converter, said first switching unit including means for selectively communicating D.C. input signals it receives from said A.C. to D.C. converter to said second switching unit, a second control means connected to said first switching unit for controlling said selective communication of input signals, a plurality of signal measuring devices connected to said second switching unit, said second switching unit including means for selectively communicating input signals it receives from said stepping switch and said first switching unit to said signal measuring devices as directed by said A.C. responsive control means, a recorder connected to said plurality of signal measuring devices, means connected to said plurality of signal measuring devices for producing a voltage pulse whenever a measurement is made, said means being connected to said second switching unit to transmit said voltage pulse thereto, said second control means connected to said second switching unit, a sequence advance switch connected between said second switching unit and said stepping switch, said second switching unit including means for selectively communicating said voltage pulse to said second control means and to said sequence advance switch as directed by said A.C. responsive control means.

10. An automatic checkout system employing a switch matrix, said switch matrix including a plurality of relays each having a control coil and a plurality of terminals, a first relay having two input signal terminals, a second relay having one terminal connected to a first relay terminal and another terminal connected to said first relay input signal terminal, and control means connected between a first relay terminal and the second relay control coil for controlling said second relay in accordance with input signals received by said first relay and sent to said control means.

11. An automatic checkout system comprising a switch matrix and a plurality of electrical devices, said switch matrix including a plurality of relays each having a control coil and a plurality of terminals, an input signal lead, a first relay having two terminals connected to said input signal lead and receiving input signals therefrom, a second relay having one terminal connected to a first relay terminal and another terminal connected to said input signal lead, control means connected between a first relay terminal and the second relay coil for controlling said second relay in accordance with input signals from said input signal lead, said first relay selectively switching said input signals to said control means and said second relay, a plurality of signal measuring devices connected to said second relay and selectively receiving said input signals therefrom as directed by said control means, and signal recording means connected to said plurality of signal measuring devices whereby said input signals are measured and recorded.

12. An automatic checkout system comprising a stepping switch having a plurality of input terminals and an output terminal and a control circuit, a first relay and second relay each having a plurality of terminals and a control coil, two first relay terminals connected to said stepping switch output terminal, a second relay terminal connected to said stepping switch output terminal and another second relay terminal connected to a first relay terminal, A.C. responsive control means connected between a first relay terminal and the second relay control coil, an A.C. to D.C. converter having an input lead and an output lead connected to terminals of said first relay, said first relay selectively switching input signals it receives from said stepping switch to said second relay and said A.C. responsive control means and said A.C. to D.C. converter, said first relay selectively switching D.C. input signals it receives from said A.C. to D.C. converter to said second switching unit, a second control means connected to the first relay control coil for controlling said selective switching of input signals, a plurality of signal measuring devices connected to terminals of said second relay, said second relay selectively switching input signals it receives from said stepping switch and said first relay to said signal measuring devices as directed by said A.C. responsive control means, a recorder connected to said plurality of signal measuring devices, means connected to said plurality of signal measuring devices for producing a voltage pulse whenever a measurement is made, said means being connected to a second relay terminal to transmit said voltage pulse thereto, said second control means connected to a second relay terminal, a sequence advance switch connected between a second relay terminal and said stepping switch control circuit, said second relay selectively switching said voltage pulse to said second control means and said sequence advance switch as directed by said A.C. responsive control means.

13. An automatic checkout system comprising a stepping switch having a plurality of input terminals and an output terminal and a control circuit, a first relay and second relay each having a plurality of terminals and a control coil, two first relay terminals connected to said stepping switch output terminal, a second relay terminal connected to said stepping switch output terminal and another second relay terminal connected to a first relay terminal, A.C. responsive control means connected between a first relay terminal and the second relay control coil, an A.C. to D.C. converter having an input lead and an output lead connected to terminals of said first relay, said first relay selectively switching input signals it receives from said stepping switch to said second relay and said A.C. responsive control means and said A.C. to D.C. converter, said first relay selectively switching D.C. input signals it receives from said A.C. to D.C. converter to said second switching unit, a second control means connected to the first relay control coil for controlling said selective switching of input signals, a D.C. voltmeter and a frequency meter connected to terminals of said second relay, said second relay selectively switching input signals it receives from said stepping switch and said first relay to said D.C. voltmeter or said frequency meter as directed by said A.C. responsive control means, a tape recorder connected to said D.C. voltmeter and said frequency meter, means connected to said D.C. voltmeter and said frequency meter for producing a voltage pulse whenever a measurement is made, said means being connected to a second relay terminal to transmit said voltage pulse thereto, said second control means connected to a second relay terminal, a sequence advance switch connected between a second relay terminal and said stepping switch control circuit, said second relay selectively switching said voltage pulse to said second control means and said sequence advance switch as directed by said A.C. responsive control means.

14. A switch matrix for use in an automatic checkout system, said matrix having an input signal lead, a first and second relay each having a control coil and a plurality of terminals, said first relay having two terminals connected to said input signal lead, said second relay having a terminal connected to said input signal lead and a terminal connected to a first relay terminal other than one connected to said input signal lead, A.C. responsive control means connected between a first relay terminal and the second relay control coil, and a second control means connected between a second relay terminal and the first relay control coil.

15. A switch matrix for use in an automatic checkout system, said matrix having an input signal lead, a first and second relay each having a control coil and a plurality of terminals, said first relay having two terminals connected to said input signal lead, said second relay having one terminal connected to said input signal lead and another terminal connected to a first relay terminal other than one connected to said input signal lead, an A.C. amplifier having an input lead connected to receive signals from a first relay terminal, a third relay having a plurality of terminals and a control coil, said third relay control coil connected to and controlled by said A.C. amplifier, a third relay terminal connected to a power supply source and another third relay terminal connected to the second relay control coil, and control means connected between a second relay terminal and the first relay control coil.

16. A switch matrix for use in an automatic checkout system, said matrix having an input signal lead, a first and second relay each having a control coil and a plurality of terminals, said first relay having two terminals connected to said input signal lead, said second relay having one terminal connected to said input signal lead and another terminal connected to a first relay terminal other than one connected to said input signal lead, an A.C. amplifier having an input lead connected to receive signals from a first relay terminal, a third relay having a plurality of terminals and a control coil, said third relay control coil connected to and controlled by said A.C. amplifier, a third relay terminal connected to a power supply source and another third relay terminal connected to the second relay control coil, a fourth relay having a control coil and a plurality of terminals, said fourth relay control coil connected to a second relay terminal, a fourth relay terminal connected to a power supply source, and a fourth relay terminal connected to said first relay control coil.

17. An automatic checkout system employing a switch matrix, said switch matrix including a plurality of relays each having a control coil and a plurality of terminals, a first relay having two input signal terminals, a second relay having one terminal connected to a first relay terminal and another terminal connected to a first relay input signal terminal, control means connected between a first relay terminal and the second relay control coil for controlling said second relay in accordance with input signals received by said first relay and sent to said control means, a constant current generator, and means for selectively connecting said generator to a first relay input signal terminal.

18. An automatic checkout system comprising a switch matrix and a plurality of electrical devices, said switch matrix including a plurality of relays each having a control coil and a plurality of terminals, an input signal lead, a first relay having two terminals connected to said input signal lead and receiving input signals therefrom, a second relay having one terminal connected to a first relay terminal and another terminal connected to said input signal lead, control means connected between a first relay terminal and the second relay coil for controlling said second relay in accordance with input signals from said input signal lead, said first relay selectively switching said input signals to said control means and said second relay, a constant current generator, means for selectively connecting said generator to said input signal lead, a plurality of signal measuring devices connected to said second relay and selectively receiving said input signals therefrom as directed by said control means, and signal recording means connected to said plurality of signal measuring devices whereby said input signals are measured and recorded.

References Cited in the file of this patent
UNITED STATES PATENTS

| | | |
|---|---|---|
| 2,180,164 | Minneci | Nov. 14, 1939 |
| 2,328,750 | Smith | Sept. 7, 1943 |
| 2,329,491 | Sulzer | Sept. 14, 1943 |
| 2,423,119 | Retallack | July 1, 1947 |
| 2,538,789 | Maynard | Jan. 23, 1951 |
| 2,742,611 | Antos et al. | Apr. 17, 1956 |
| 2,769,958 | Meadows et al. | Nov. 6, 1956 |
| 2,787,740 | Helmert | Apr. 2, 1957 |
| 2,820,192 | Gittings et al. | Jan. 14, 1958 |
| 2,891,144 | Yalich | June 16, 1959 |
| 2,895,088 | Koenig | July 14, 1959 |
| 2,907,902 | McIntosh et al. | Oct. 6, 1959 |
| 2,950,437 | Stahl | Aug. 23, 1960 |

FOREIGN PATENTS

| | | |
|---|---|---|
| 214,213 | Australia | Mar. 28, 1958 |

OTHER REFERENCES

"Sequential Aspects of Relay Circuits," A.I.E.E. Technical Paper 49–146; May 1949; pages 1–10.

"Automatic Circuit Tester" article in Electronics, October 1954; pages 136–139.